United States Patent Office 2,728,794
Patented Dec. 27, 1955

2,728,794

N-FORMYL N'-CARBAMYL PHENYLENE DIAMINES AND PREPARATION THEREOF

Saul R. Buc, Easton, Pa., assignor to General Aniline & Film Corporation, New York, N. Y., a corporation of Delaware No Drawing. Application April 27, 1953,
Serial No. 351,490

18 Claims. (Cl. 260—553)

This invention relates to the preparation of new phenylenediamine derivatives, and more particularly to the preparation of asymmetrically substituted phenylenediamine derivatives wherein one amino group is alkylated and formylated and the second amino group is converted to form a substituted urea type compound.

One object of my invention is to provide a new class of chemical compounds derived from phenylenediamines and methods of making same.

Another object of my invention is to provide new chemical compounds derived from meta-phenylenediamine and methods of making same.

Still another object of my invention is to provide new chemical compounds derived from para-phenylenediamine and methods of making same.

Other objects will become apparent hereinafter.

The chemical compounds contemplated herein have the following structural formula:

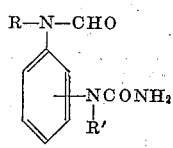

wherein R represents an alkyl group such as methyl, ethyl, propyl, isopropyl, butyl, etc., and R' represents hydrogen or any of the groups which R may represent.

In accordance with my invention the chemical compounds encompassed herein are prepared from compounds of the following structural formula:

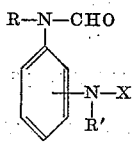

wherein R and R' may be any of the groups defined above and X may be hydrogen or —CHO, which compounds are first treated with hydrochloric acid to form the corresponding hydrochloride salt having the formula:

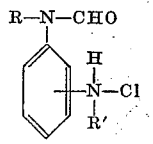

wherein R, R' and X are as above defined, and then these salts are converted to the urea compounds by treatment with potassium cyanate.

The precursors for the urea derivatives of the instant invention as defined above are either monoformyl derivatives of the corresponding phenylenediamine as for example p-amino N-methyl formanilide, which is a well known compound and may be prepared in the manner set forth in U. S. P. 1,273,901 or the diformyl derivatives of the corresponding phenylenediamine which may be prepared in the manner described in copending application Serial No. 224,444, filed May 3, 1951, now U. S. Patent 2,647,815. The symmetrical dialkyl, diformyl meta- and para-phenylenediamines may also be prepared from resorcinol and hydroquinone by the Bücherer reaction with subsequent formylation. The extension of the Bücherer reaction to hydroquinone to produce dialkylated phenylenediamines is described in copending application Serial No. 265,042, filed January 4, 1952.

It is also within the scope of the present invention to prepare compositions containing a mixture of compounds encompassed by the generic formula given above. Said mixtures may contain not only a plurality of dialkylated derivatives wherein the alkyl group on the same nucleus are similar but may also contain dialkylated derivatives having different alkyl groups on the same nucleus. Such mixtures of the diformyl precursor compounds are described in the aforementioned applications. No attempt has been made to isolate the individual components of said mixture since the mixtures are valuable compositions in themselves.

The compounds and compositions of this invention are valuable intermediates in the preparation of other organic compounds. The compounds and compositions are particularly valuable as solubilizing agents for ionic compounds in polar solvents. Specificaly, the compounds of my invention are extremely effective for promoting the solubilization of the alkali metal salts of the sulfuric acid esters of the leuco form of vat dyestuffs in aqueous mediums, and particularly in aqueous printing paste formulations. This property of the instant compounds is extremely valuable since one of the major problems one is faced with in vat dyeing is to produce a uniform, level, nonspecky dyed product. To effect this, it is necessary to have the dyestuff in as fine a state of sub-division as possible and preferably in solution. The new compounds and compositions of this invention enhance the solubility of the sulfuric acid esters of vat dye-stuffs in aqueous mediums, thereby leading to level, non-specky dyeings.

The compounds and compositions of the present invention include the following:

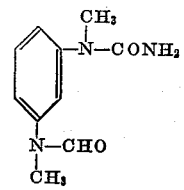

N,N'-dimethyl, N-formyl N'-carbamyl m-phenylene-diamine

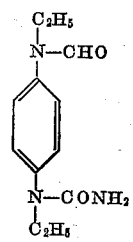

N,N'-diethyl, N-formyl N'-carbamyl p-phenylene-diamine

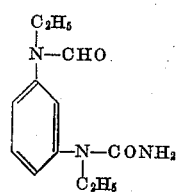

N,N'-diethyl, N-formyl N'-carbamyl m-phenylene-diamine

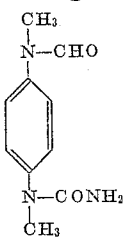
N,N'-dimethyl, N-formyl N'-carbamyl p-phenylene-diamine

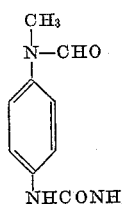
N-methyl, N-formyl N'-carbamyl p-phenylene-diamine

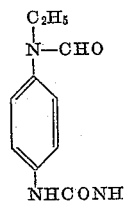
N-ethyl, N-formyl N'-carbamyl p-phenylene-diamine

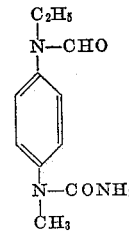
N-ethyl, N'-methyl, N-formyl, N'-carbamyl p-phenylenediamine

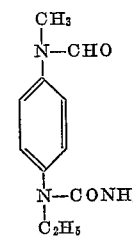
N-methyl, N'-ethyl N-formyl, N'-carbamyl p-phenylenediamine

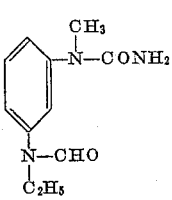
N-methyl, N'-ethyl, N-carbamyl N'-formyl m-phenylenediamine

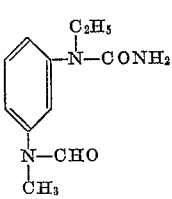
N-ethyl, N'-methyl, N-carbamyl N'-formyl m-phenylenediamine

The following examples will serve to illustrate further the manner of practicing my invention.

EXAMPLE 1

*N,N'-dimethyl, N-formyl, N'-carbamyl m-phenylenediamine*

A sample of N,N'-dimethyl, N,N'-diformyl m-phenylenediamine, described in application Serial No. 224,444, is refluxed with exactly one equivalent of HCl as a 10% solution until no precipitate is formed on cooling. The resulting solution of the monohydrochloride

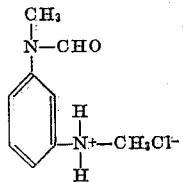

is cooled with ice and treated with a slight excess of potassium cyanate. The product which has the formula

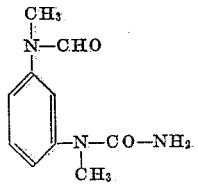

precipitates and is filtered off, washed, and dried.

EXAMPLE 2

*N,N'-diethyl, N-formyl, N'-carbamyl p-phenylenediamine*

A sample of N,N'-diethyl, N,N'-diformyl, p-phenylenediamine, described in application Serial No. 224,444 is treated in the identical manner set forth in Example 1. The product has the formula:

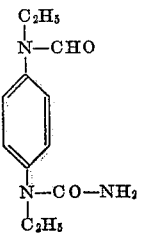

EXAMPLE 3

*N,N'-diethyl, N-formyl, N'-carbamyl m-phenylenediamine*

A sample of N,N'-diethyl, N,N'-diformyl m-phenylenediamine, described in application Serial No. 224,444, is treated in the identical manner set forth in Example 1. The product has the formula:

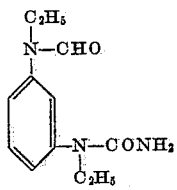

EXAMPLE 4

*N,N'-dimethyl, N-formyl, N'-carbamyl p-phenylenediamine*

A sample of N,N'-dimethyl, N,N'-diformyl p-phenylenediamine, described in application Serial No. 224,444, is treated in the identical manner set forth in Example 1. The product has the formula

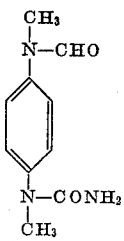

EXAMPLE 5

*N-methyl, N-formyl, N'-carbamyl, p-phenylenediamine*

A sample of p-amino, N-methyl formanilide, as described in application Serial No. 224,444, is dissolved in a slight excess of hydrochloric acid and treated with a slight excess of potassium cyanate in the presence of ice. The product crystallized at once as it filtered, washed, and dried. The product has the formula

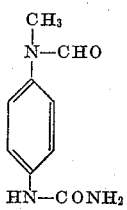

EXAMPLE 6

*N-ethyl, N-formyl, N'-carbamyl, p-phenylenediamine*

This compound is prepared identically as the one of Example 5, but starting with the corresponding ethyl derivative. The product has the formula:

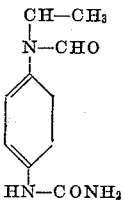

EXAMPLE 7

A sample of a mixture of N,N'-dimethyl, N,N'-diformyl p-phenylenediamine, N,N'-diethyl, N,N'-diformyl-p-phenylenediamine and N-methyl, N'-ethyl, N,N'-diformyl-p-phenylenediamine, wherein the methyl and ethyl groups are in the ratio of 1:3 (described in application Serial No. 224,444) is treated as in Example 1. The resulting composition comprises a mixture of the compounds of Examples 2 and 4 and additionally the compounds N-ethyl, N'-methyl, N-formyl, N'-carbamyl p-phenylenediamine and N-methyl, N'-ethyl, N-formyl, N'-carbamyl-p-phenylenediamine wherein the methyl to ethyl groups are in the ratio of 1:3.

I claim:

1. Compounds of the formula

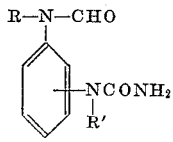

wherein the relationship of the nitrogen atoms is selected from the group of positions consisting of meta and para, wherein R is a lower alkyl radical and R' is a member selected from the group consisting of hydrogen and lower alkyl radicals.

2. Compounds of the formula

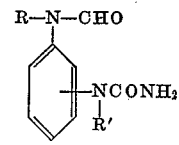

wherein R is a lower alkyl radical and R' is a member selected from the group consisting of hydrogen and lower alkyl radicals.

3. Compounds as defined in claim 2 wherein R and R' are alkyl radicals.

4. Compounds as defined in claim 2 wherein R is an alkyl radical and R' is hydrogen.

5. Compounds of the formula

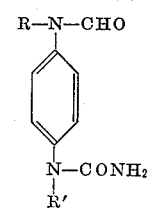

wherein R is a lower alkyl radical and R' is a member selected from the group consisting of hydrogen and lower alkyl radicals.

6. Compounds as defined in claim 5 wherein R and R' are alkyl radicals.

7. Compounds as defined in claim 5 wherein R is an alkyl radical and R' is hydrogen.

8. The compound N,N'-diethyl, N-formyl, N'-carbamyl p-phenylenediamine having the formula:

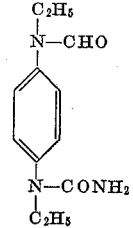

9. The compound N,N'-diethyl, N-formyl, N'-carbamyl m-phenylenediamine having the formula:

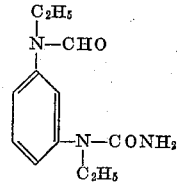

10. The compound N,N'-dimethyl, N-formyl, N'-carbamyl m-phenylenediamine having the formula:

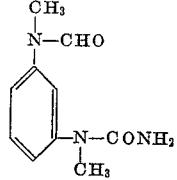

11. The compound N,N'-dimethyl, N-formyl, N'-carbamyl p-phenylenediamine having the formula:

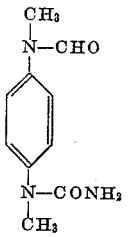

12. The compound N-methyl, N-formyl, N'-carbamyl p-phenylenediamine having the formula

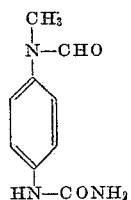

13. The mixture of N,N'-diethyl, N-formyl, N'-carbamyl p-phenylenediamine, N,N'-dimethyl, N-formyl, N'-carbamyl p-phenylenediamine, N-ethyl, N'-methyl, N-formyl, N'-carbamyl p-phenylenediamine, and N-methyl, N'-ethyl, N-formyl, N'-carbamyl p-phenylenediamine wherein the methyl to ethyl groups are in the ratio of 1:3.

14. A process for preparing compounds of the formula

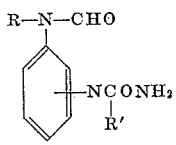

wherein the relationship of the nitrogen atoms is selected from the group of positions consisting of meta and para, wherein R is a lower or alkyl radical and R' is a member selected from the group consisting of hydrogen and lower alkyl radicals, which comprises first treating compounds of the formula

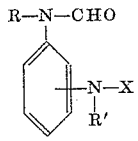

wherein R is a lower alkyl radical and R' is a member selected from the group consisting of hydrogen and lower alkyl radicals and X is a member selected from the group consisting of hydrogen and —CHO, with hydrochloric acid to form the corresponding hydrochloride salt and then treating with potassium cyanate.

15. A process for preparing compounds of the formula

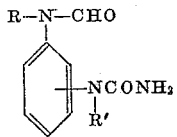

wherein the relationship of the nitrogen atoms is selected from the group of positions consisting of meta and para, wherein R is a lower alkyl radical and R' is a member selected from the group consisting of hydrogen and lower alkyl radicals, which comprises first treating compounds of the formula

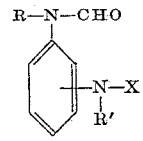

wherein R is a lower alkyl radical, R' is a member selected from the group consisting of hydrogen and lower alkyl radicals and X is a member selected from the group consisting of hydrogen and —CHO, with hydrochloric acid to form the corresponding hydrochloride salt, cooling said salt in solution, treating said solution with a slight excess of potassium cyanate and isolating the resulting amide.

16. The process for preparing N,N'-diethyl, N-formyl, N'-carbamyl p-phenylenediamine which comprises refluxing N,N'-diethyl, N,N'-diformyl p-phenylenediamine with about one equivalent of a solution of hydrochloric acid until no precipitate is formed on cooling, cooling the resulting solution, adding a slight excess of potassium cyanate and isolating the resulting precipitate of N,N'-diethyl, N-formyl, N'-carbamyl p-phenylenediamine.

17. The process for preparing N,N'-dimethyl, N-formyl, N'-carbamyl p-phenylenediamine which comprises refluxing N,N'-dimethyl, N,N'-diformyl p-phenylenediamine with about one equivalent of a solution of hydrochloric acid until no precipitate is formed on cooling, cooling the resulting solution, adding a slight excess of potassium cyanate and isolating the resulting precipitate of N,N'-dimethyl, N-formyl, N'-carbamyl p-phenylenediamine.

18. The process for preparing N-methyl, N-formyl, N'-carbamyl p-phenylenediamine which comprises dissolving p-amino, N-methyl formanilide in hydrochloric acid, treating with a slight excess of potassium cyanate at a temperature of about 0° C., and isolating the resulting precipitate of N-methyl, N-formyl, N'-carbamyl p-phenylenediamine.

No references cited.